June 27, 1950  F. A. KOESTER  2,512,864
AXIALLY SHIFTING TYPE SCREW ACTUATED
TIRE REMOVING DEVICE
Filed Feb. 15, 1946  2 Sheets-Sheet 1
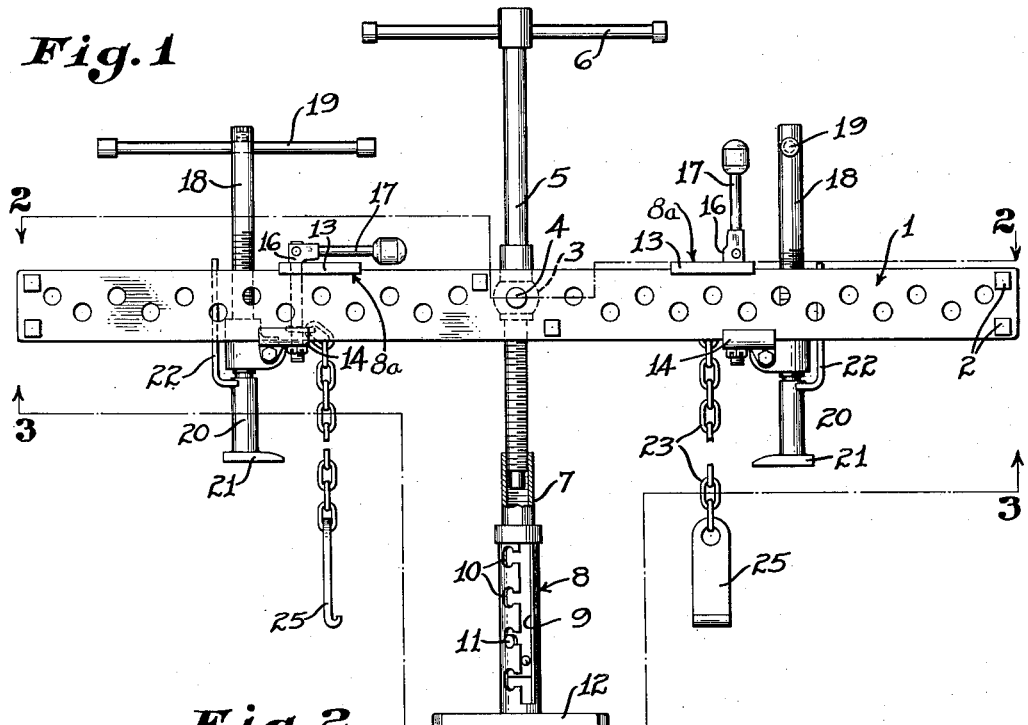
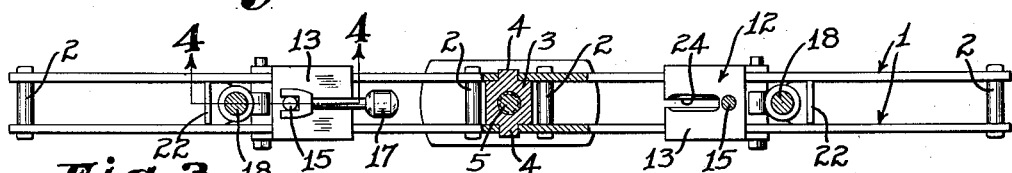
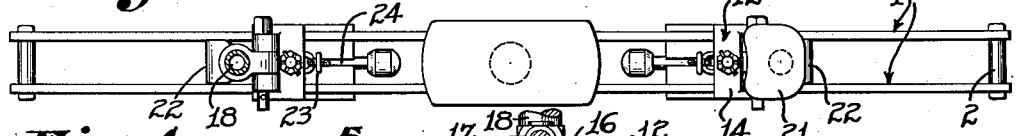
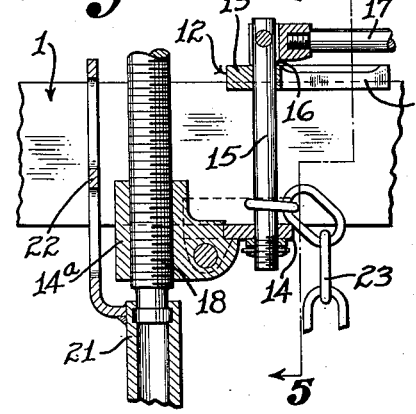
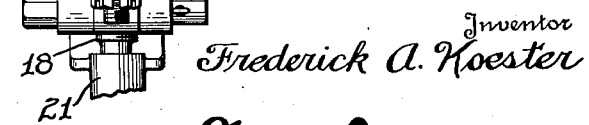
Inventor
Frederick A. Koester
By Lyon & Lyon
Attorneys

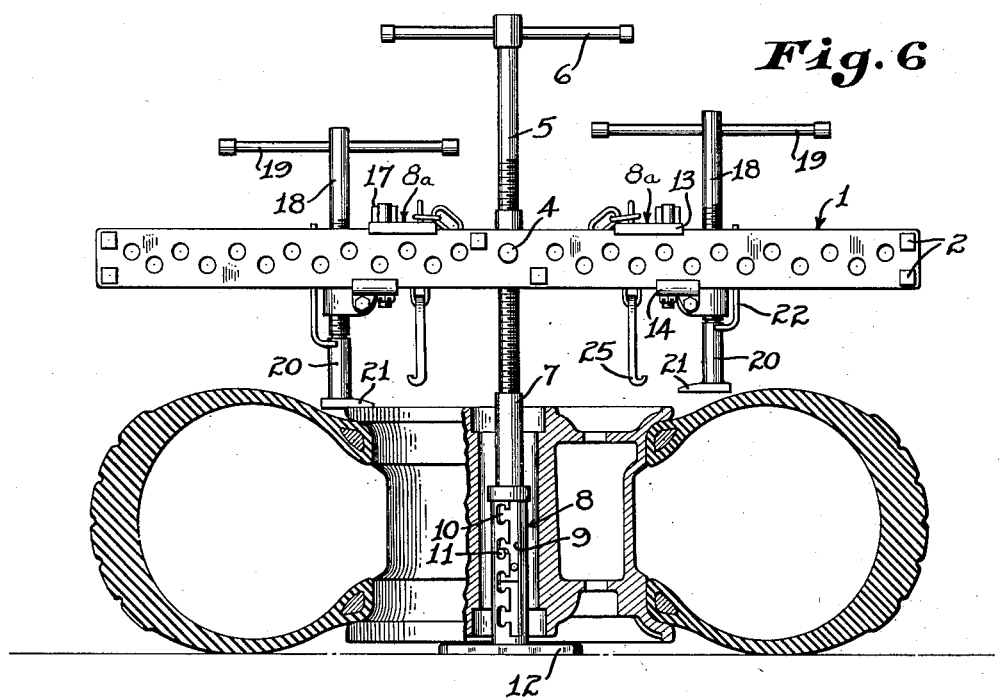
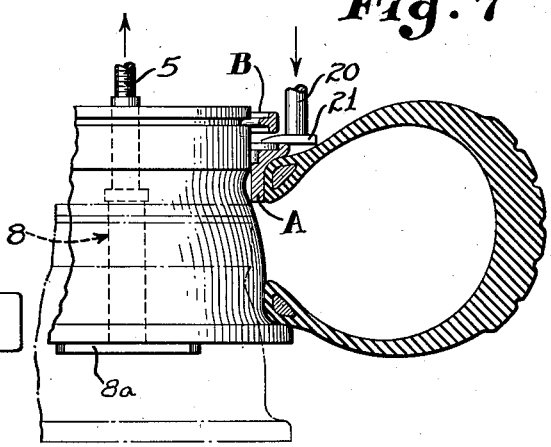
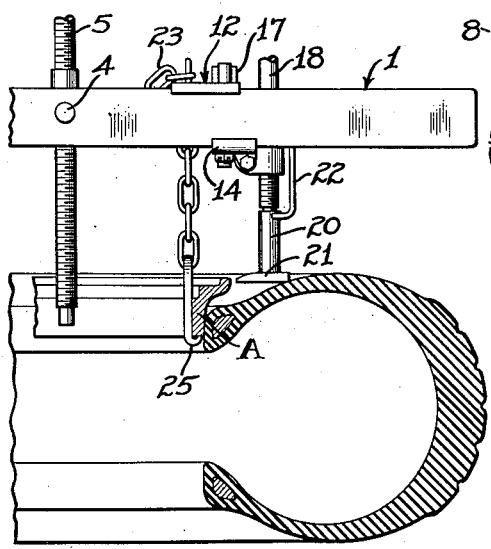

Patented June 27, 1950

2,512,864

UNITED STATES PATENT OFFICE 2,512,864

AXIALLY SHIFTING TYPE SCREW ACTUATED TIRE REMOVING DEVICE

Frederick A. Koester, Los Angeles, Calif.

Application February 15, 1946, Serial No. 647,976

5 Claims. (Cl. 157—1.2)

My invention relates to tire removing apparatus, and more particularly to apparatus adapted to remove large and heavy airplane tires or the heavy duty tires employed on large trucks or earth moving equipment.

Among the objects of my invention are:

First, to provide a tire removing apparatus which greatly reduces the work and attendant danger normally incidental to the removing of large tires, particularly when the tires have been in use for a long period and have vulcanized to some extent to the wheel or the wheel has been rusted or corroded.

Second, to provide a tire removing apparatus which although designed for large tires, is relatively light in weight and readily portable.

Third, to provide a tire removing apparatus which may be employed in the removing of tires from either "drop center" or the removable flange type of tire rim.

Fourth, to provide a tire removing apparatus wherein a beam is adjustably supported in diametrical relation to the tire and its wheel structure and independent thrust members are employed to press the beads of the tire or the removable flange of the tire rim as desired and which incorporates novel means whereby such removable flange may be restrained while the tire bead is stripped therefrom.

With the above and other objects in view as may appear hereinafter, reference is directed to the accompanying drawings in which:

Figure 1 is a side elevational view of my tire removing apparatus.

Figure 2 is a parallel plan view thereof taken substantially along the line 2—2 of Figure 1.

Figure 3 is a partial sectional, partial bottom view thereof taken substantially along the line 3—3 of Figure 1.

Figure 4 is an enlarged detail cross sectional view thereof taken through 4—4 of Figure 2.

Figure 5 is an enlarged detail transverse sectional view taken through 5—5 of Figure 4.

Figure 6 is a side view of my apparatus shown in one of its operating positions in relation to an airplane tire and its wheel, the tire being shown in section and the wheel partially in section.

Figure 7 is a fragmentary view of an airplane wheel having a removable flange, showing the manner in which my apparatus is employed to free the flange from the tire bead, the flange and tire being shown in section.

Figure 8 is a similar fragmentary view of an airplane tire and removable flange showing the manner in which my apparatus is employed to complete removal of the flange.

These various elements of my tire removing apparatus are mounted on a pair of beams 1 which are spaced by tie bolts 2. The beams may be provided with a series of holes to lighten their weight. Between the central points of the two beams is mounted a journal block 3 having pins 4 which extend through holes in the beams.

Rotatably mounted but restrained against axial movement in the journal block 3 is an elevator stem 5, the upper end of which is provided with a handle 6 and the lower end of which is threaded. The lower end of the elevator stem 5 is adapted to coact with a threaded tubular extension 7 which in turn fits within a sleeve 8. The sleeve 8 is provided with a longitudinal slot 9 along one side of which is provided a series of notches 10. A pin 11 extending radially from the tubular extension 7 is adapted to slide into the slot 9 or fit into any one of the lateral notches 10. The lower end of the sleeve 8 is provided with a base plate 8a.

The two diametrical arms formed by the beams 1 are adapted to receive slides 12. Each slide includes a top plate 13 and a bottom plate 14 grooved or flanged at their sides to fit over or under, as the case may be, the upper end and lower edges of the beams 2. The plates straddle the beams 2 and are joined by a pin 15 extending vertically between the beams. The upper end of the pin 15 has pivotally connected thereto a locking cam 16 and a cam lever 17. The arrangement of the cam 16 is such that when the lever 17 is in the horizontal position shown in Figure 4 and the left-hand side of Figure 1, the slide is locked in place. Whereas, when the handle is in a vertical position as shown at the right-hand side of Figure 1, the slide is released for movement along the beams 1.

Secured to the lower or bottom plate 14 of each slide is a traveler nut 14A having a vertically threaded bore disposed between the beams 1 and adapted to receive a stem 18. The upper end of each stem 18 is provided with a cross handle 19. Journalled on the lower end of each stem 18 is an extension member 20 terminating in a foot 21. Secured to a side of the extension 20 is a strap 22 which extends in opposite relation upwardly between the beams 1 to prevent rotation of the corresponding foot member 21.

The pin 15 of each slide is employed to anchor one end of a chain 23. The upper or top clamp plate 13 of each slide is provided with a slot 24 adapted to receive any of the links of the chain so that the effective length of the chain 23 may be adjusted. The lower end of each chain 23 is provided with a hook 25.

Operation of my tire removing apparatus is as follows:

In removing a tire from either a drop center rim or a rim having a removable flange, it is necessary to press the beads of the tire inwardly from their respective rims so as to break any bond which may have developed, whether due to vulcanizing action of the tire or rusting or corroding of the rim. Sometimes this bond is extremely difficult to break.

It is effectively broken by my apparatus by placing the tire wheel over the sleeve 8 and extension 7, then mounting the beams 1 over the tire by inserting the threaded lower end of the stem 5 into the extension 7 and adjusting the heights and radial spacing of the foot members relative to the tire so that the foot members may be thrust downward to bear against the side of the tire adjacent its bead. Upward force on the beams 1 is counteracted by the base plate 8a which engages the hub of the wheel. The foot members are urged downwardly until the bead breaks free of the rim at and near the points of engagement of the foot members; the foot members are then elevated or the beam as a whole elevated and rotated about the journal block 3 to a new position and the process repeated. This operation may be repeated on one or both sides of the tire whether the tire be mounted on a drop-center rim or removable flange rim.

In the special case of a rim having a removable flange, it is preferred to modify the operation by first employing the foot members 21 to engage the removable flange designated A in Figures 7 and 8 and remove it clear of the locking ring designated B in Figure 2. Thereupon the locking ring may be removed. Before or after this locking operation the opposite bead has been broken away from the fixed flange of the wheel.

In the event that the wheel does not have a central hub and also in the operation of removing the flange A from the tire after the tire and flange have been removed from the wheel, the chains 23 and hooks 25 are employed. The hooks 25 are placed under the flange A, as shown in Figure 8, or may be connected with other parts of the vehicle wheel as desired to prevent movement of such flange or parts away from the beams 1 while the foot members 21 are caused to strip the bead therefrom.

It should be noted that, although threaded stems 5 and 18 operating in mating threaded elements have been shown, hydraulic piston and cylinder means may be substituted.

Having fully described my invention, it is to be understood that I do not wish to be limited to the details herein set forth, but my invention is of the full scope of the appended claims.

I claim:

1. An apparatus for removing tires from wheel structures, comprising: a pair of beam members disposed edgewise in parallel relation and separated by spacers; slide units including slide elements adapted to ride on the upper and lower edges of said beam members, a connecting stem extending between said elements and a clamping means associated with said stem for tightening or loosening said slide elements; an extensible device including a collar hinged to said slide unit, a screw-threaded thrust member threaded in said collar, a foot at the lower extremity of said thrust member and an arm extending upwardly from said foot between said beams to restrain said foot against rotation, said foot being engageable with a tire adjacent a bead thereof; and means connected with said beam for engaging the far side of a vehicle wheel disposed within said tire.

2. An apparatus for removing tires from wheel structures, comprising: a pair of beam members disposed edgewise in parallel relation and separated by spacers; slide units including slide elements adapted to ride on the upper and lower edges of said beam members, a connecting stem extending between said elements and a clamping means associated with said stem for tightening or loosening said slide elements; an extensible device including a collar hinged to said slide unit, a screw-threaded thrust member threaded in said collar, a foot at the lower extremity of said thrust member and an arm extending upwardly from said foot between said beams to restrain said foot against rotation, said foot being engageable with a tire adjacent a bead thereof; and a chain anchored to said slide unit and having a hook engageable with the far side of a vehicle wheel disposed within said tire.

3. An apparatus for removing tires from wheel structures, comprising: a pair of beam members disposed edgewise in parallel relation and separated by spacers; a pair of slide units each including slide elements fitting the upper and lower edges of said beam members, and clamping means connecting said slide elements and operable to tighten and loosen said slide elements relative to said beam members; an extensible device for each slide unit including a collar hinged to said slide unit, a screw-threaded thrust member threaded in said collar, a foot at the lower extremity of said thrust member and an arm extending from said foot between said beam members to restrain said foot against rotation; and means connected with said beam for engaging the far side of a vehicle wheel disposed within said tire.

4. An apparatus for removing tires from wheel structures, comprising: a pair of beam members disposed edgewise in parallel relation and separated by spacers; a pair of slide units each including slide elements fitting the upper and lower edges of said beam members, and clamping means connecting said slide elements and operable to tighten and loosen said slide elements relative to said beam members; an extensible device for each slide unit including a collar hinged to said slide unit, a screw-threaded thrust member threaded in said collar, a foot at the lower extremity of said thrust member and an arm extending from said foot between said beam members to restrain said foot against rotation; and a chain anchored to each of said slide units, each chain having a hook for engagement with the far side of a vehicle wheel disposed within said tire.

5. An apparatus for removing tires from wheel structures, comprising: a pair of beam members disposed edgewise in parallel relation and separated by spacers; a pair of slide units each including slide elements fitting the upper and lower edges of said beam members, and clamping means connecting said slide elements and operable to tighten and loosen said slide elements relative to said beam members, an extensible device for each slide unit including a collar hinged to said slide unit, a screw-threaded thrust member threaded in said collar, a foot at the lower extremity of said thrust member and an arm extending from said foot between said beam members to restrain said foot against rotation; a collar pivotally mounted between said beam members and said hinge collars; a stem journaled therein but axially restrained; a sleeve threaded on said shaft; and an extensible anchor plate carried by said sleeve.

FREDERICK A. KOESTER.

REFERENCES CITED

The following references are of record in the file of this patent:

UNITED STATES PATENTS

| Number | Name | Date |
|---|---|---|
| 181,123 | Aldred | Aug. 15, 1876 |
| 1,242,354 | Kutschenreuter | Oct. 9, 1917 |
| 1,416,094 | Krauska | May 16, 1922 |
| 1,564,496 | Staugaard | Dec. 8, 1925 |
| 1,729,861 | Anderson | Oct. 1, 1929 |
| 1,948,434 | Stafford et al. | Feb. 20, 1934 |
| 2,010,713 | Countryman | Aug. 6, 1935 |
| 2,391,626 | Howard | Dec. 25, 1945 |
| 2,406,996 | Colley | Sept. 3, 1946 |

FOREIGN PATENTS

| Number | Country | Date |
|---|---|---|
| 720,878 | France | Dec. 12, 1931 |
| 612,890 | Germany | May 7, 1935 |